United States Patent
Kwon et al.

(10) Patent No.: US 9,156,490 B2
(45) Date of Patent: Oct. 13, 2015

(54) STEERING COLUMN FOR VEHICLE

(71) Applicant: MANDO CORPORATION, Pyeongtaek-si, Gyeonggi-do (KR)

(72) Inventors: Hyun Bi Kwon, Yongin-si (KR); Sung Bin Cho, Seongnam-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 6 days.

(21) Appl. No.: 14/024,268

(22) Filed: Sep. 11, 2013

(65) Prior Publication Data

US 2014/0076092 A1    Mar. 20, 2014

(30) Foreign Application Priority Data

Sep. 18, 2012 (KR) .................. 10-2012-0103512

(51) Int. Cl.
*B62D 1/184* (2006.01)
*B62D 1/187* (2006.01)

(52) U.S. Cl.
CPC ............. *B62D 1/187* (2013.01); *B62D 1/184* (2013.01)

(58) Field of Classification Search
CPC ............................ B62D 1/184; B62D 1/187
USPC .................... 74/493, 495; 280/775, 777
See application file for complete search history.

(56) References Cited

U.S. PATENT DOCUMENTS

| 4,793,204 | A | * | 12/1988 | Kubasiak | 74/493 |
| 5,161,425 | A | * | 11/1992 | Baskett et al. | 74/493 |
| 5,338,064 | A | * | 8/1994 | Sadakata et al. | 280/775 |
| 5,503,431 | A | * | 4/1996 | Yamamoto | 280/777 |
| 5,722,299 | A | * | 3/1998 | Yamamoto et al. | 74/493 |
| 6,092,955 | A | * | 7/2000 | Chartrain et al. | 403/283 |
| 6,279,414 | B1 | * | 8/2001 | Moon | 74/493 |
| 6,419,269 | B1 | * | 7/2002 | Manwaring et al. | 280/775 |
| 7,677,133 | B2 | * | 3/2010 | Matsui et al. | 74/493 |
| 7,712,782 | B2 | * | 5/2010 | Kim | 280/775 |
| 7,717,011 | B2 | * | 5/2010 | Hirooka | 74/493 |
| 2012/0325041 | A1 | * | 12/2012 | Sakuma | 74/493 |

FOREIGN PATENT DOCUMENTS

| DE | 69801871 T2 | 7/2002 | | |
| DE | 69631252 T2 | 11/2004 | | |
| DE | 102008064383 A1 | 7/2009 | | |
| GB | 2273971 A | * | 7/1994 | ............... B62D 1/18 |
| WO | 0234607 A1 | 5/2002 | | |

* cited by examiner

*Primary Examiner* — Laura Freedman (74) *Attorney, Agent, or Firm* — McDermott Will & Emery LLP (57) ABSTRACT

Disclosed is a steering column for a vehicle. According to the present invention, an actuating member and a fixed member can be smoothly coupled to each other without causing a catching feeling during a tilting operation of a steering column and noise generated when the actuating member and the fixed member are coupled to each other can be prevented. Further, the actuating member can be prevented from deviating from a coupling range of the fixed member when the adjusting lever is released or fastened for a tilting operation, increasing a safety of a tilting operation of the steering column.

7 Claims, 7 Drawing Sheets

STEERING COLUMN FOR VEHICLE

CROSS-REFERENCE TO RELATED APPLICATION

This application claims priority from and the benefit under 35 U.S.C. §119(a) of Korean Patent Application No. 10-2012-0103512, filed on Sep. 18, 2012, which is hereby incorporated by reference for all purposes as if fully set forth herein.

BACKGROUND OF THE INVENTION

1. Field of the Invention

The present invention relates to a steering column for a vehicle, and more particularly to a steering column for a vehicle which allows an actuating member and a fixed member to be smoothly coupled to each other without causing a catching feeling during a tilting operation of a steering column, prevents noise from being generated when the actuating member and the fixed member are coupled to each other, and prevents the actuating member from deviating from a coupling range of the fixed member when an adjusting lever is released or fastened for a tiling operation, increasing a safety of a tilting operation of the column.

2. Description of the Prior Art

In general, a steering apparatus for a vehicle is an apparatus for changing a driving direction of a vehicle according to an intention of a driver, and helps to arbitrarily change a rotation center about which front wheels of a vehicle turn to progress the vehicle in a direction desired by a driver.

In the steering apparatus for a vehicle, a steering force generated when a driver manipulates the steering wheel is transmitted to a rack-pinion mechanism through a steering shaft and finally changes a direction of the two wheels.

A telescopic or tilting function may be added to the steering apparatus for a vehicle. Steering apparatuses are classified into a telescopic steering apparatus and a tilting steering apparatus according to their functions, and a tilting function may be added to the telescopic steering apparatus if necessary. Through the functions, a driver can adjust a protrusion degree or an inclination angle of a steering wheel according to a height or a body shape of the driver, thereby achieving a smooth steering operation.

Figure 1:
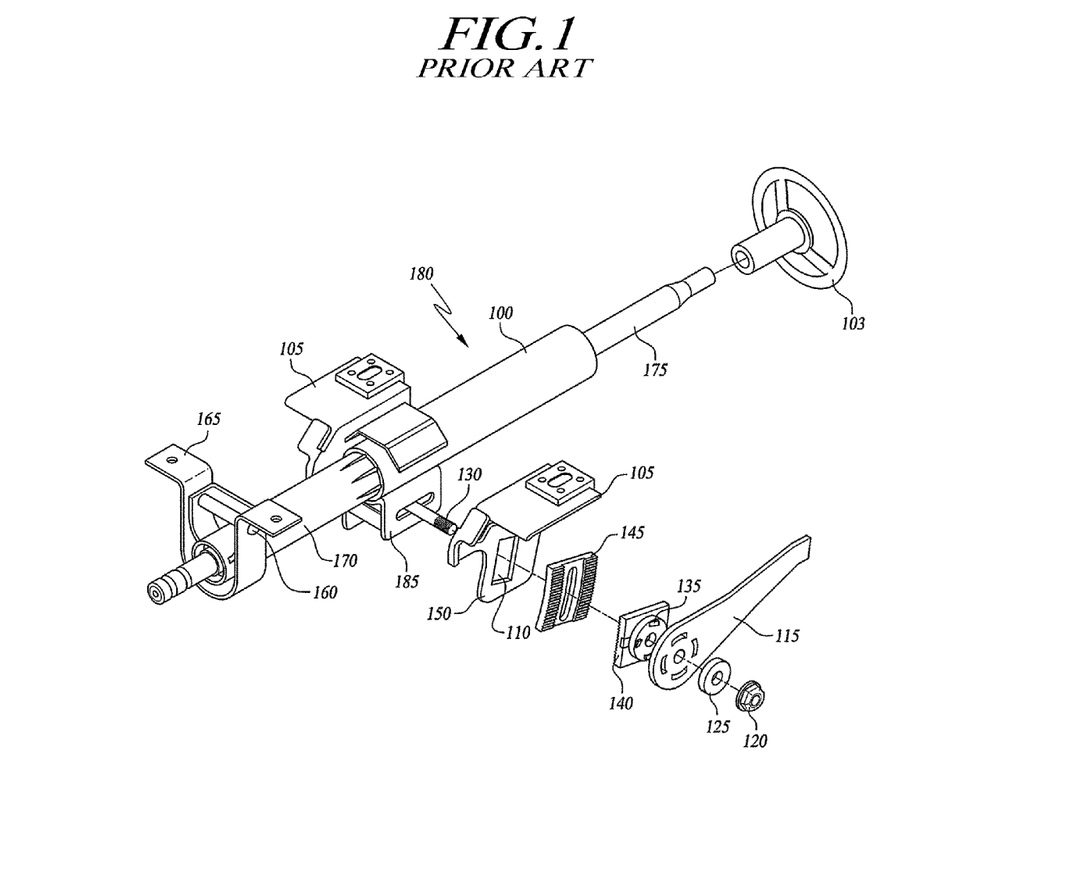
FIG. 1 is a perspective view showing a part of a steering column for a vehicle according to the related art.

FIG. 1 is a perspective view showing a part of a steering column for a vehicle according to the related art.

As shown, a general steering column 180 for a vehicle according to the related art includes an outer tube 100 accommodating a steering shaft 175, an inner tube 170 introduced into the outer tube 100, a lower bracket 165 fixing the inner tube 170 to a vehicle body, a mounting bracket 105 installed at an upper side of the outer tube 100 to be fixed to the vehicle body, a tilt bracket 150 integrally fixed to the steering column so that an inclination angle of the steering wheel 103 can be adjusted and having a tilt hole 110, a fixed member 145 formed on an outer peripheral surface of the tilt bracket 150, an actuating member 140 engaged with or separated from the fixed member 145, a tilt bolt 130 passing through the tilt hole 110, a cam 135 coupled to the actuating member 140, and a bush 125 and a nut 120 fixing the cam 135 and an adjusting lever 115.

The fixed member 145 and the actuating member 140 are formed to have the same pitch and the same thread height to be engaged with each other such that the fixed member 145 and the actuating member 140 are engaged with each other to fix the outer tube 100 and the steering shaft 175 while the adjusting lever 115 is locked, whereas the actuating member 140 is separated from the fixed member 145 by the cam 135 if the adjusting lever 115 is released so that an upper steering column 180 can be rotated in a tilting direction about a lower tilting center 160.

The actuating member 140 is attached to the cam 135 and a protrusion is formed on one surface of the cam 135 so that the protrusion can be introduced into or extracted from a recess of the adjusting lever 115 as the adjusting lever 115 is rotated to couple or separate the fixed member 145.

However, in the steering column for a vehicle according to the related art, a catching feeling is generated when the actuating member and the fixed member are slid with respect to each other during a tilting operation of the steering column and a sliding noise is generated.

Further, the actuating member deviates from an actuating range thereof when the actuating member is slid while being supported by the fixed member in a state in which the adjusting lever is released for a tilting operation, significantly deteriorating a safety of a tilting operation of the steering column.

SUMMARY OF THE INVENTION

Accordingly, the present invention has been made to solve the above-mentioned problems occurring in the prior art, and an object of the present invention is to provide a steering column for a vehicle which allows an actuating member and a fixed member to be smoothly coupled to each other without causing a catching feeling during a tilting operation of a steering column, prevents noise from being generated when the actuating member and the fixed member are coupled to each other, and prevents the actuating member from deviating from a coupling range of the fixed member when an adjusting lever is released or fastened for a tiling operation, increasing a safety of a tilting operation of the column.

In order to accomplish this object, there is provided a steering column for a vehicle including: a tilt bracket coupled to the steering column; a fixed member coupled to an outer surface of the tilt bracket and having a plurality of bosses protruding from a bottom surface thereof at locations spaced apart from each other at a predetermined interval; and an actuating member located to face the fixed member and having a plurality of second bosses protruding from a bottom surface thereof and coupled between the first bosses while being coupled to or separated from the fixed member in a facing direction during an operation of an adjusting lever.

According to the present invention, an actuating member and a fixed member can be smoothly coupled to each other without causing a catching feeling during a tilting operation of a steering column and noise generated when the actuating member and the fixed member are coupled to each other can be prevented.

Further, the actuating member can be prevented from deviating from a coupling range of the fixed member when the adjusting lever is released or fastened for a tilting operation, increasing a safety of a tilting operation of the steering column.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, embodiments of the present invention will be described in detail with reference to the accompanying drawings.

Figure 2:
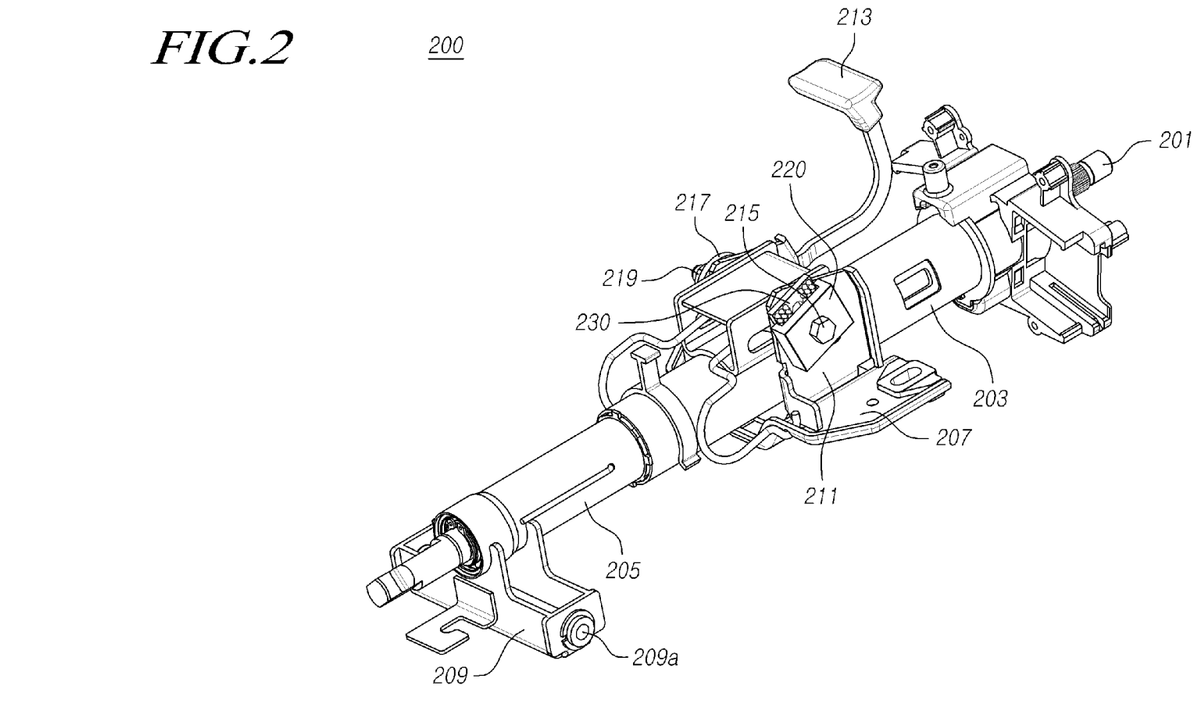
FIG. 2 is a perspective view showing a part of a steering column for a vehicle according to an embodiment of the present invention.
Figure 3:
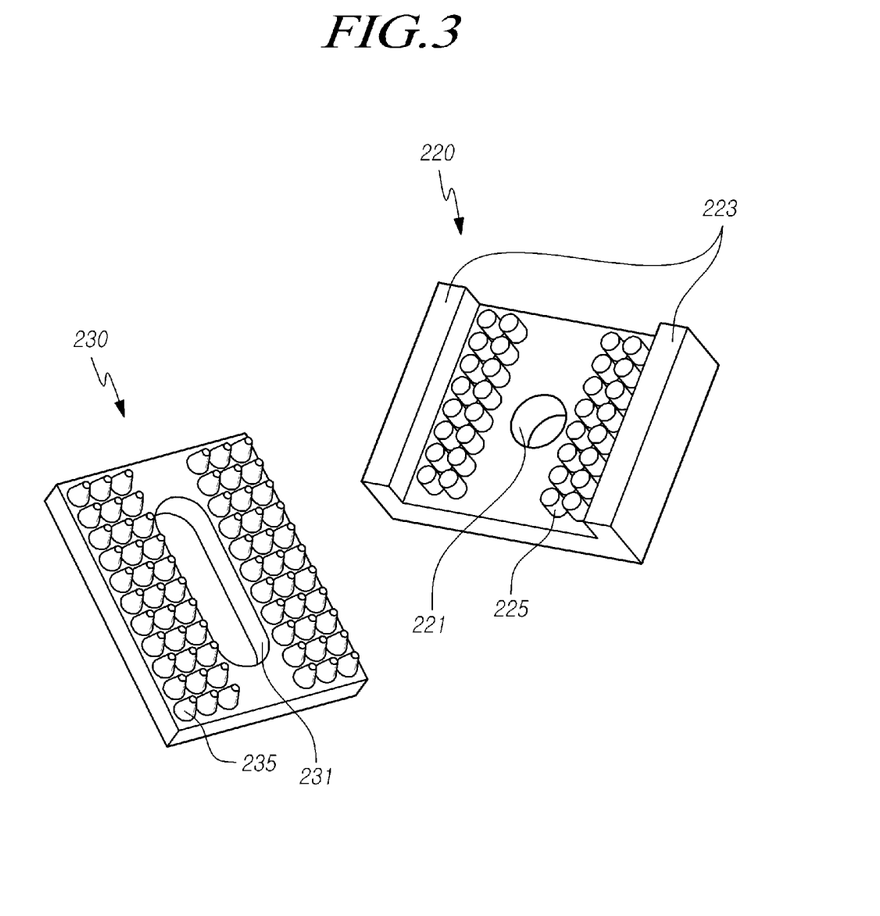
FIGS. 3 and 4 are perspective views showing various examples of a fixed member and an actuating member of the steering column for a vehicle according to the embodiment of the present invention.
Figure 4:
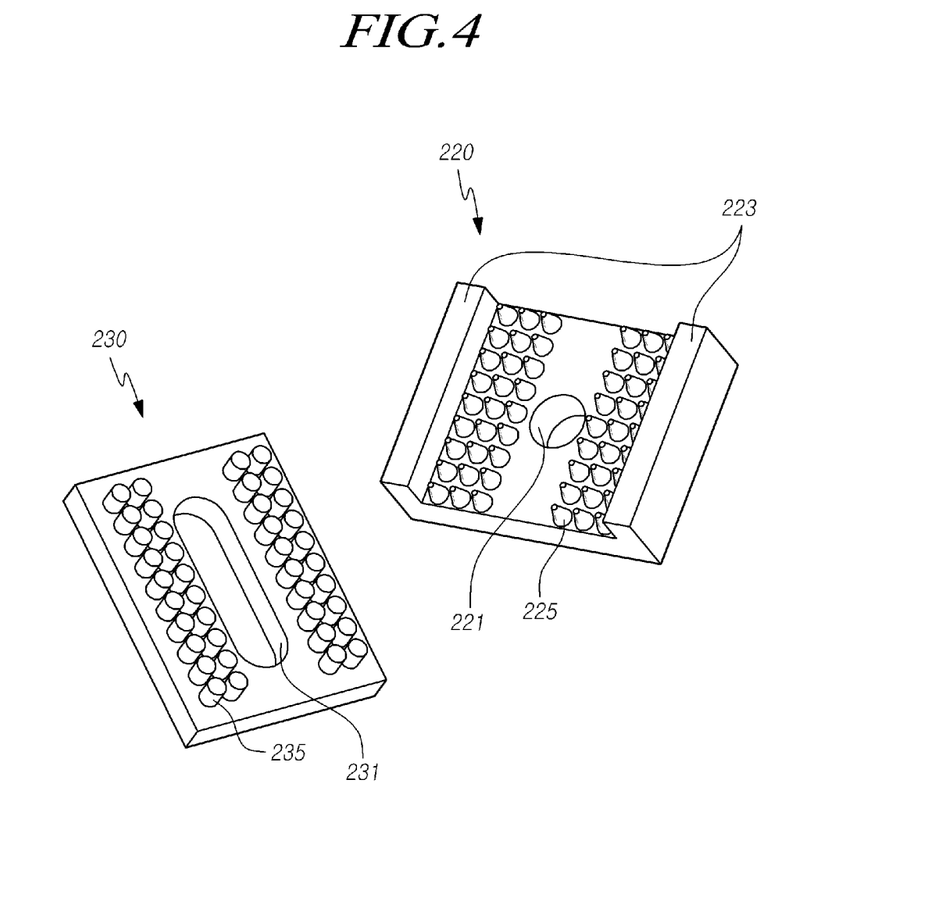
Figure 5:
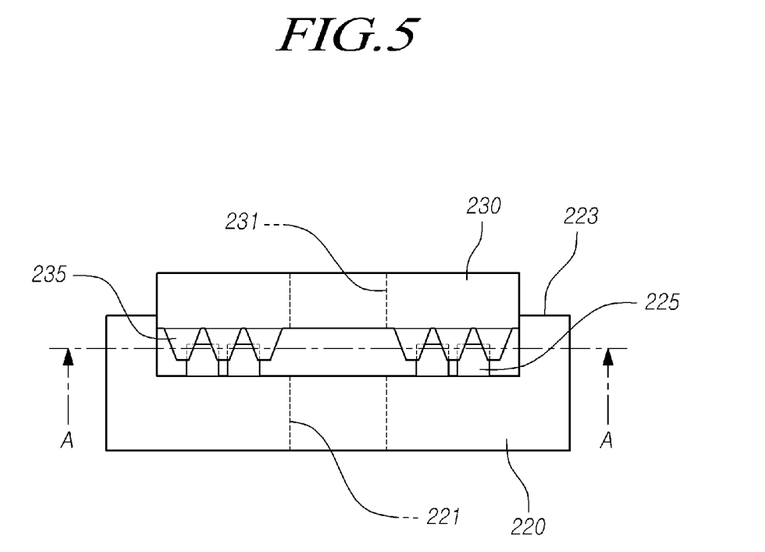
FIG. 5 is a side view showing a state in which the fixed member and the actuating member of the steering column for a vehicle according to the embodiment of the present invention are coupled to each other.
Figure 6:
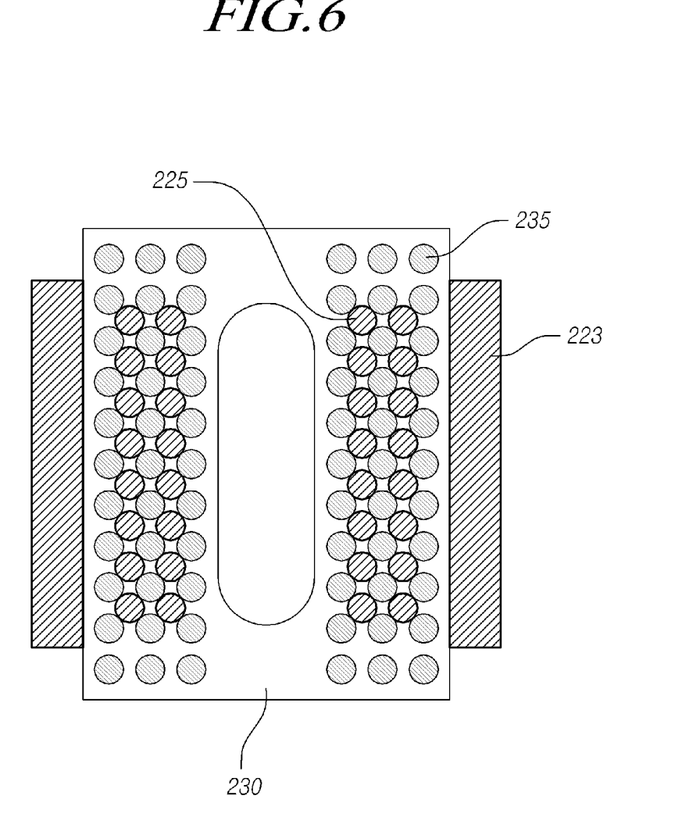
FIGS. 6 and 7 are sectional views showing portion A-A of FIG. 5, and are views showing various examples of the fixed member and the actuating member.
Figure 7:
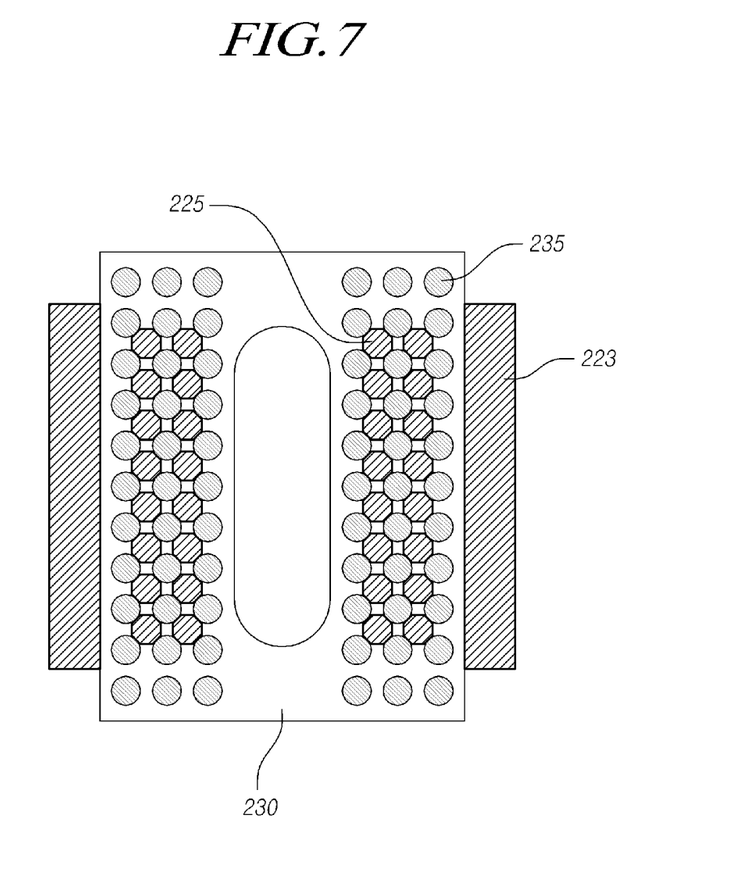

FIG. 2 is a perspective view showing a part of a steering column for a vehicle according to an embodiment of the present invention. FIGS. 3 and 4 are perspective views showing various examples of a fixed member and an actuating member of the steering column for a vehicle according to the embodiment of the present invention. FIG. 5 is a side view showing a state in which the fixed member and the actuating member of the steering column for a vehicle according to the embodiment of the present invention are coupled to each other. FIGS. 6 and 7 are sectional views showing portion A-A of FIG. 5, and are views showing various examples of the fixed member and the actuating member.

As shown in the drawings, the steering column 200 for a vehicle according to the embodiment of the present invention includes an outer tube 203 accommodating a steering shaft 201, an inner tube 205 introduced into the outer tube 203, a lower bracket 209 fixing the inner tube 205 to a vehicle body, a mounting bracket 207 installed at an upper side of the outer tube 203 to be fixed to the vehicle body, a tilt bracket 211 integrally fixed to the steering column 200, a fixed member 230 coupled to an outer surface of the tilt bracket 211, an actuating member 220 engaged with or separated from the fixed member 230, a tilt bolt 215 passing through a tilt operating hole (not shown) of the tilt bracket 211, a cam 217 coupled to an adjusting lever 213, and a bush and a nut 219 fixing the cam 217 and the adjusting lever 213.

The steering column 200 includes a tilt mechanism for adjusting an inclination angle of the steering wheel. The outer tube 203 accommodates the steering shaft 201 and the inner tube 205 is introduced into the outer tube 203.

The lower bracket 209 includes a hinge unit 209a forming a tilt shaft during a tilting operation while fixing the inner tube 205 to the vehicle body, and the mounting bracket 207 is installed at an upper side of the outer tube 203 to fix the steering column 200 to the vehicle body.

The fixed member 230 is coupled to an outer side of the tilt bracket 211, and the actuating member 220 is engaged with or separated from the fixed member 230. The tilt bolt 215 passes the tilt operating hole of the tilt bracket 211, and the bush and the nut 219 fix the cam 217 and the adjusting lever 213.

In a state in which the adjusting lever 213 is locked, the fixed member 230 and the actuating member 220 are attached to each other and the outer tube 203 and the steering shaft 201 are fixed. On the other hand, if the adjusting lever 213 is released, the actuating member 220 is separated from the fixed member 230 by the cam 217 so that the steering column 200 can move in a tilting direction about the hinge unit 209a.

The tilt bracket 211 is coupled to the mounting bracket 207 to be integrally fixed to the steering column 200, and has a tilt operating hole having an arc shape about the hinge unit 209a to adjust an inclination angle of the steering wheel.

The fixed member 230 is coupled to an outer surface of the tilt bracket 211 and has a tilt slot hole 231 through which a tilt bolt 215 is moved in an arc path together with the steering column 200 during a tilting operation. The fixed member 230 has first bosses 235 engaged with or separated from second bosses 225 of the actuating member 220.

As shown in FIG. 3, the first bosses 235 of the fixed member 230 are formed on opposite sides of the tilt slot hole 231. The first bosses 235 of the fixed member 230 protrude from a bottom surface of the fixed member 230, and a plurality of first bosses 235 are arranged at locations spaced by a predetermined interval.

The actuating member 220 has a through-hole 221 through which the tilt bolt 215 passes and is moved by a tilt angle along the fixed member 230 together with the steering column 200 and the tilt bolt 215 during a tilting operation. Supports 223 between which opposite ends of the fixed member 230 are inserted are formed at opposite ends of the actuating member 220 such that the supports 223 can be moved while being supported by opposite ends of the fixed member 230.

The actuating member 220 is located to face the fixed member 230, and has a plurality of second bosses 225 coupled between the first bosses 235 of the fixed member 230 while being coupled to or separated from the fixed member 230 in opposite directions during an operation of the adjusting lever 213.

The first bosses 235 and the second bosses 225 are formed at alternate locations when the fixed member 230 and the actuating member 220 are coupled to each other such that the first bosses 235 are coupled between the second bosses 225 to be firmly coupled to the second bosses 225 so as not to be moved upward, downward, leftward, and rightward.

That is, one side bosses among the first bosses 235 and the second bosses 225 are arranged in a form of a grid having regular intervals, and the other side bosses thereof are arranged at locations corresponding to centers of eyelets of the grid.

Thus, as shown in FIGS. 3 and 4, three rows of first bosses 235 are formed on opposite sides of the tilt slot hole 231 of the fixed member 230, respectively, and two rows of second bosses 225 are formed on opposite sides of the through-hole 221 of the actuating member 220, respectively, so that one second boss 225 makes point-contact with four first bosses 235 as shown in FIG. 6.

The first bosses 235 and the second bosses 225 protrude from the bottom surfaces of the fixed member 230 and the actuating member 220 by the same degree, respectively, and maintain a predetermined interval when the actuating member 220 and the fixed member 230 are coupled to each other.

A cross-section of one side bosses of the first bosses 235 and the second bosses 225 gradually decreases as it goes away from the bottom surface thereof, and the other side bosses has the same cross-section from the bottom surface to a tip end thereof.

For example, one side bosses of the first bosses 235 and the second bosses 225 may have a conic shape, and the other side bosses thereof may have a cylindrical shape. As shown in FIG. 3, the first bosses 235 may have a conic shape and the second bosses 225 may have a cylindrical shape.

In contrast, as shown in FIG. 4, the first bosses 235 may be formed to have a cylindrical shape and the second bosses 225 may be formed to have a conic shape.

In addition, one side bosses among the first bosses 235 and the second bosses 225 may be formed to have a conic shape and the other side bosses thereof may be formed to have a polyprism shape. Further, one side bosses of the first bosses 235 and the second bosses 225 may have a polypramid shape and the other side bosses thereof may be formed to have a cylindrical shape.

As an example, FIG. 7 shows a sectional view in which the first bosses 235 are formed to have a conic shape and the second bosses 225 are formed to have an octagonal pillar shape.

Meanwhile, if the first bosses 235 and the second bosses 225 are formed such that cross-sections thereof gradually decrease as they go away from the bottom surfaces of the fixed member 230 and the actuating member 220, a malfunction by which ends of the first bosses 235 and the second bosses 225 are not engaged with each other when the fixed member 230 and the actuating member 220 are coupled to each other while colliding with each other can be prevented.

That is, the actuating member 220 and the fixed member 230 which are manufactured through sintering or through processing after forging may have an accumulated error at coupling locations of the first bosses 235 and the second bosses 225 due to a manufacturing size error, an assembly error of the steering column, and an operation error generated due to a tilting operation during an operation of the adjusting lever.

Thus, since a cross-section of ends of one side bosses among the first bosses 235 and the second bosses 225 is smaller than a cross-section of ends of the other side bosses thereof, the coupling spaces increase at an initial stage of the coupling thereof, preventing a malfunction by which the first bosses 235 and the second bosses 225 are not engaged with each other while colliding with each other.

Thus, if a driver releases the adjusting lever 213 to set an angle of the steering wheel and locks the adjusting lever 213, the second bosses 225 of the actuating member 220 facing the fixed member 230 are moved in the facing direction while not colliding with the first bosses 235 of the fixed member 230 between the first bosses 235 of the fixed member 230, and accordingly, the second bosses 225 of the actuating member 220 can be smoothly coupled to the first bosses 235 of the fixed member 230.

According to the present invention, the actuating member and the fixed member can be smoothly coupled to each other without causing a catching feeling when a tilting operation of the steering column is performed, and noise generated when the actuating member and the fixed member are coupled to each other can be prevented.

In addition, when the adjusting lever is released or fastened for a tilting operation, the actuating member can be prevented from deviating from a coupling range of the fixed member, increasing a safety of a tilting operation of the steering column.

What is claimed is:

1. A steering column for a vehicle comprising:
a tilt bracket coupled to the steering column;
a fixed member coupled to an outer surface of the tilt bracket and having a plurality of first bosses protruding from a bottom surface thereof at locations spaced apart from each other at a predetermined interval; and
an actuating member located to face the fixed member and having a plurality of second bosses protruding from a bottom surface thereof and coupled between the first bosses while being coupled to or separated from the fixed member in a facing direction during an operation of an adjusting lever,
wherein supports between which opposite ends of the fixed member are inserted are formed at opposite ends of the actuating member, and
wherein one side bosses among the first bosses and the second bosses are arranged in a form of a grid having regular intervals and the other side bosses thereof are arranged at locations corresponding to centers of eyelets of the grid.

2. The steering column as claimed in claim 1, wherein the first bosses and the second bosses protrude from the bottom surfaces of the actuating member and the fixed member by the same degree.

3. The steering column as claimed in claim 2, wherein a cross-section of the one side bosses of the first bosses and the second bosses gradually decreases as it goes away from the bottom surface thereof, and the other side bosses thereof has a constant cross-section from the bottom surface to an end thereof.

4. The steering column as claimed in claim 2, wherein the one side bosses among the first bosses and the second bosses are formed to have a conic shape and the other side bosses thereof are formed to have a cylindrical shape.

5. The steering column as claimed in claim 2, wherein the one side bosses among the first bosses and the second bosses is formed to have a conic shape and the other side bosses thereof is formed to have a polyprism shape.

6. The steering column as claimed in claim 2, wherein the one side bosses of the first bosses and the second bosses is formed to have a polypyramid shape and the other side bosses thereof is formed to have a cylindrical shape.

7. The steering column as claimed in claim 1, wherein each of one side bosses among the first bosses and the second bosses is meshed and in contact with multiple ones of the other side bosses.

* * * * *